Inventor:
Reuben P. Grant,
By Henry J. Miller
atty

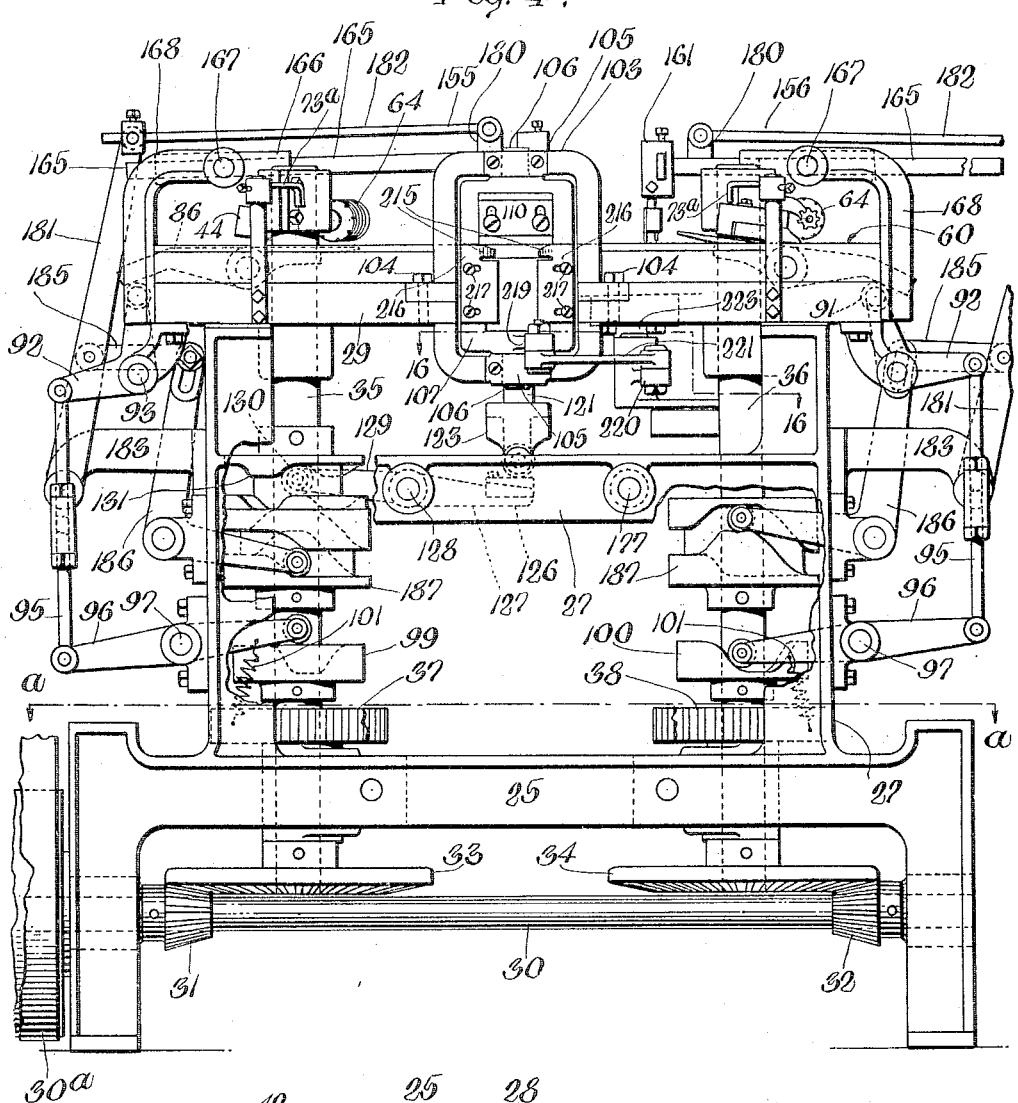
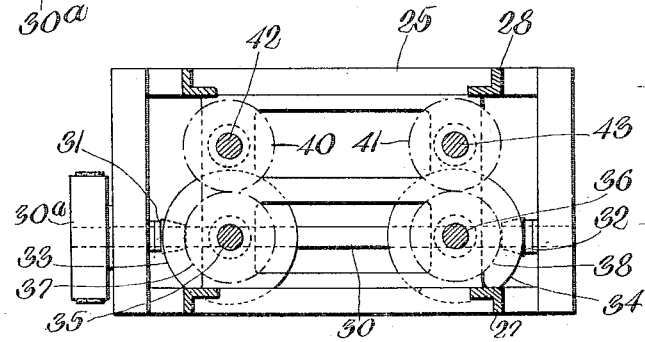

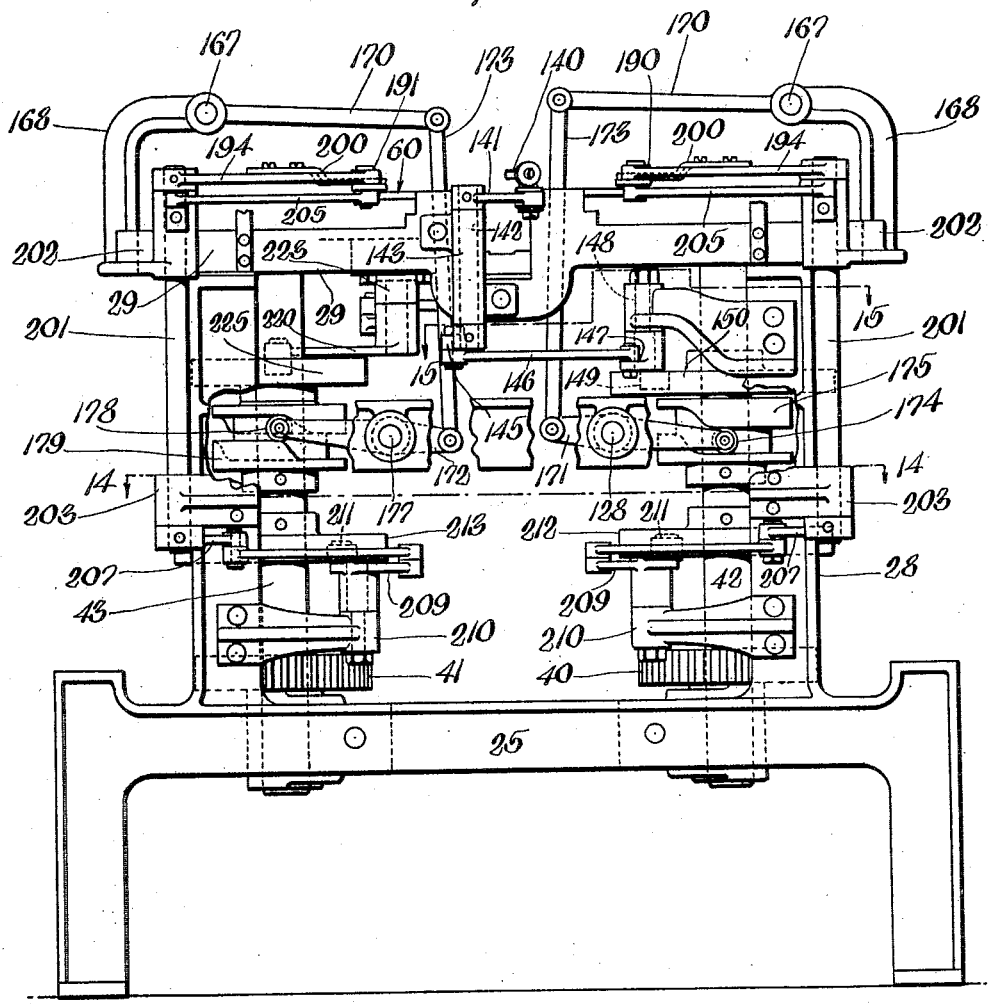

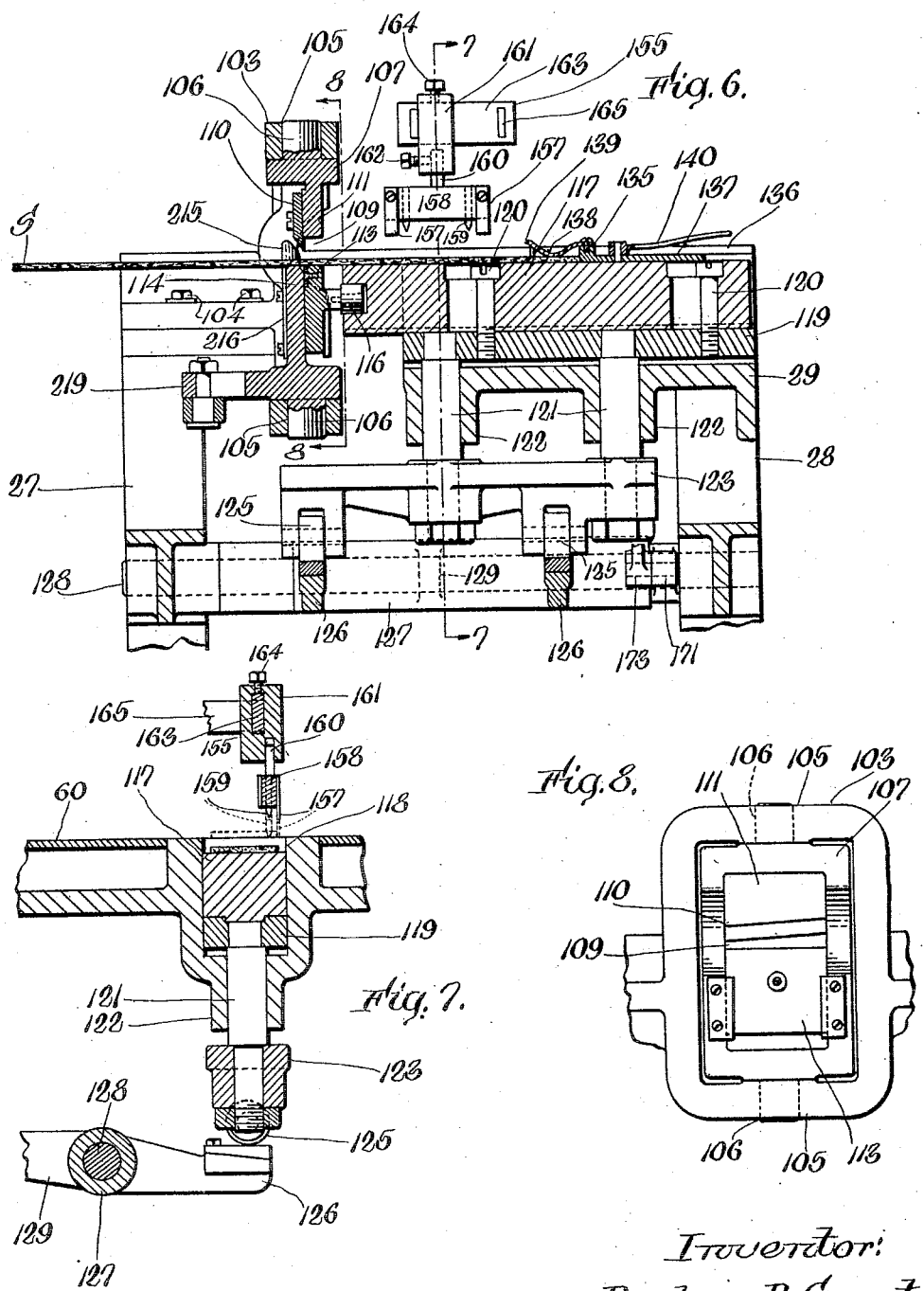

R. P. GRANT.
COUNTER SKIVING MACHINE.
APPLICATION FILED OCT. 1, 1917.
1,309,407.
Patented July 8, 1919.
7 SHEETS—SHEET 5.
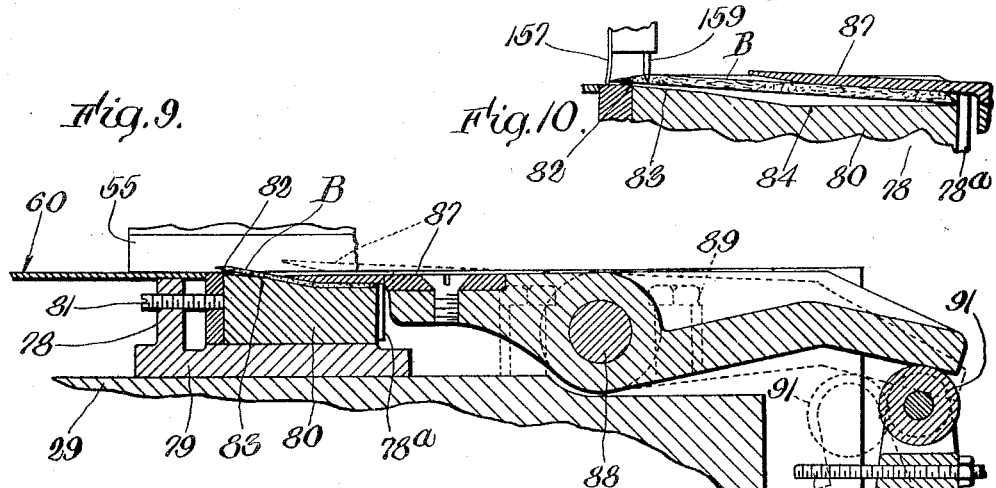
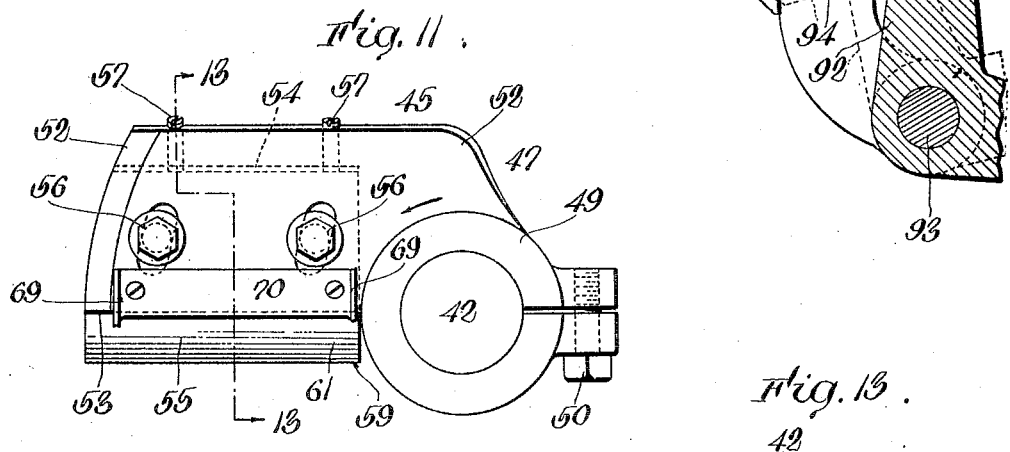
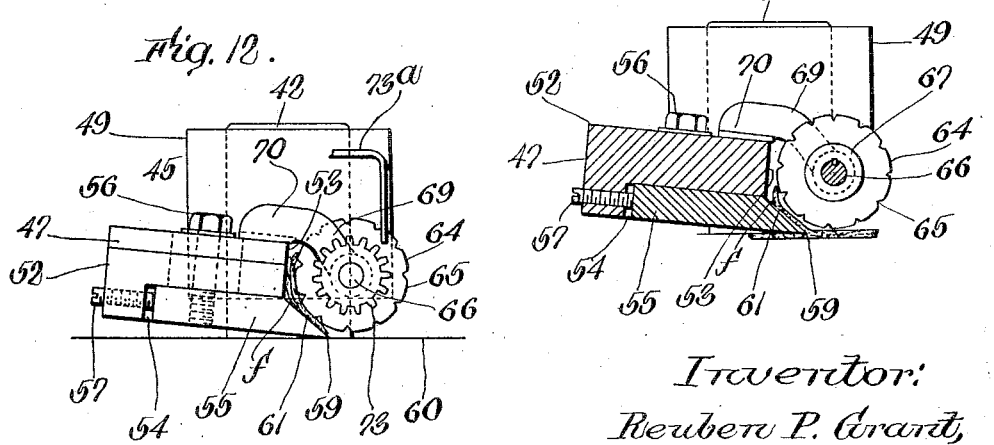
Inventor:
Reuben P. Grant,
By Henry J. Miller
atty R. P. GRANT.
COUNTER SKIVING MACHINE.
APPLICATION FILED OCT. 1, 1917.
1,309,407.
Patented July 8, 1919.
7 SHEETS—SHEET 6.
Fig. 14.
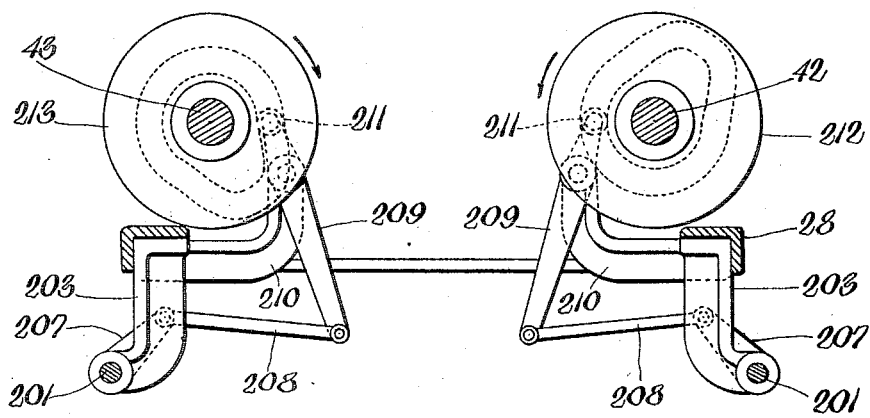
Fig. 16.
Fig. 15.
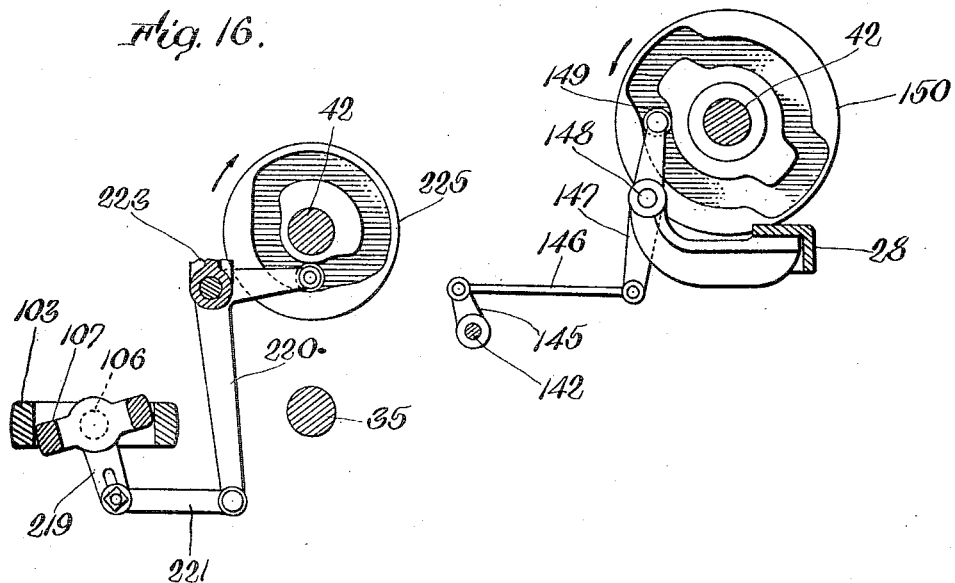
Inventor:
Reuben P. Grant,
By Henry J. Miller
atty.

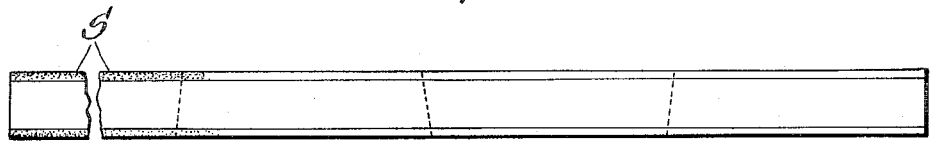
Fig. 17.
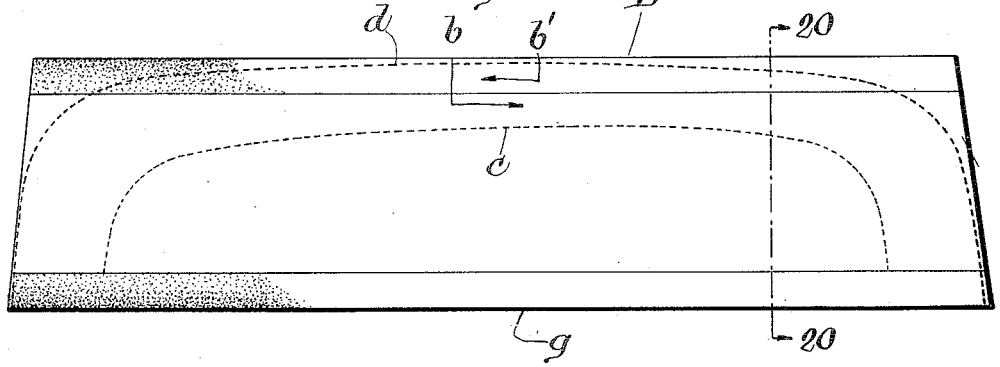
Fig. 18.
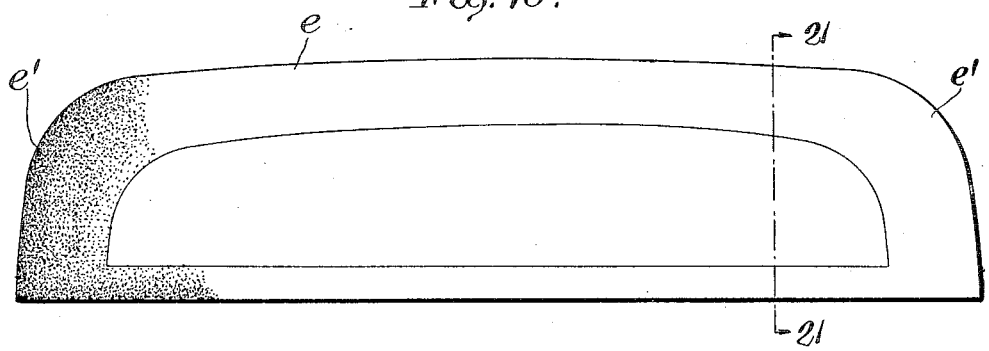
Fig. 19.
Fig. 20.
Fig. 21.
Inventor:
Reuben P. Grant,
By Henry J. Miller
atty.

UNITED STATES PATENT OFFICE.

REUBEN P. GRANT, OF MANCHESTER, NEW HAMPSHIRE, ASSIGNOR TO W. H. McELWAIN COMPANY, A CORPORATION OF MASSACHUSETTS.

COUNTER-SKIVING MACHINE.

1,309,407.   Specification of Letters Patent.   Patented July 8, 1919.

Application filed October 1, 1917. Serial No. 194,150.

*To all whom it may concern:*

Be it known that I, REUBEN P. GRANT, a citizen of the United States, and a resident of Manchester, county of Hillsborough, and State of New Hampshire, have invented certain new and useful Improvements in Counter-Skiving Machines, of which the following is a specification, reference being had to the accompanying drawings, forming part thereof.

This invention has reference to an improved machine for producing from a strip or strips of material flat counters suitably shaped and skived for use in the manufacture of boots and shoes, as said counters are delivered from this machine, or adapted to be molded or operated upon in any known and desirable manner prior to their incorporation in boots or shoes.

One object of the invention is to provide boot and shoe counters of uniform shape having beveled or skived edge portions substantially similar in all counters, which beveled portions or surfaces extend from the original surface of the counter blank substantially without irregularities of a character to render a shoe having the improved counter uncomfortable in this respect.

Another object of the invention is to provide a counter machine wherein counter blanks brought to position can be supplied from such position alternately to each of a plurality of counter skiving devices whereby the output of the machine may be increased without unduly increasing the speed of the skiving appliances or cutters.

Another object of the invention is to provide a machine of the nature described by which counter stock material in strips may be received by the machine; severed to constitute counter blanks each having a short edge and a long edge and the short edges and the ends of said blanks skived or beveled without unduly limiting the operation of the stock severing means.

Another object of the invention is to improve the counter skiving means whereby the skiving or cutting devices are operated in sweeping and opposite directions relative to the longitudinal center of the blanks.

Another object of the invention is to improve the waste discharging means.

Other objects of the invention will appear from the following description.

The invention consists in the organized means whereby the counter stock or material supplied to the machine is severed into counter blanks and said blanks are carried alternately to one of a plurality of skiving devices, are there skived and are finally delivered from the machine.

The invention also consists in the novel means for supplying the counter blanks to the blank holders for the skiving devices; in the means for holding or clamping said blanks to present their edges to the skiving devices, and in the skiving devices and means for operating the same.

The invention also consists in such other novel features of construction and combination of parts as shall hereinafter be more fully described and pointed out in the claims.

Fig. 4, represents a front view in elevation of the machine with parts broken away.

Fig. 4ª, represents a reduced sectional view taken on the line *a—a* of Fig. 4.

Fig. 5, represents a view in elevation of the rear portion of the machine, parts of the same being broken away.

Figure 1:
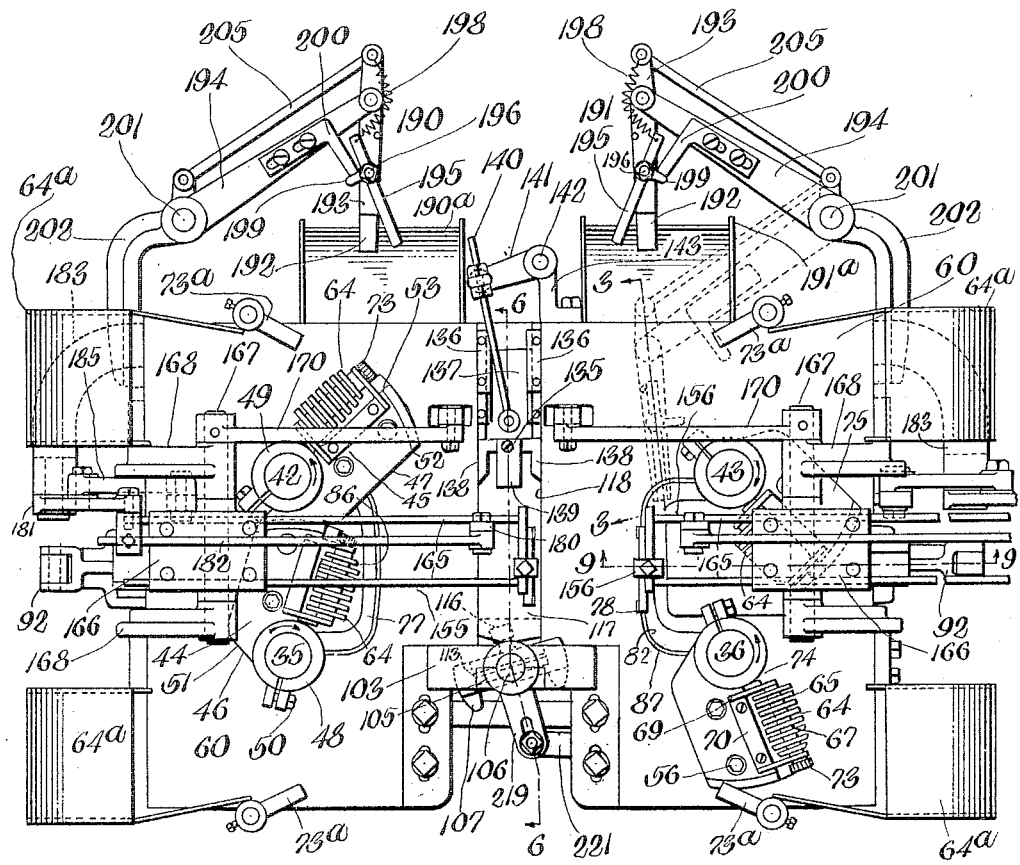
Figure 1, represents a plan view in elevation of a counter cutting machine embodying my invention.
Figure 2:
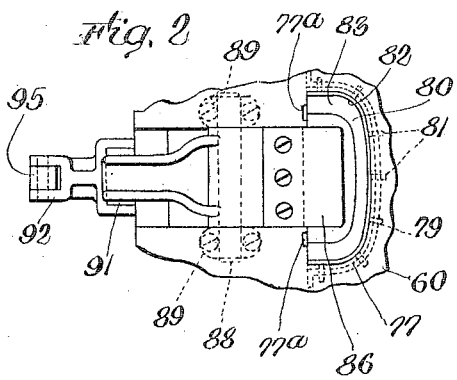
Fig. 2, represents a similar view of a portion of the machine to show a counter blank receiving die and its clapper or holder.
Figure 3:
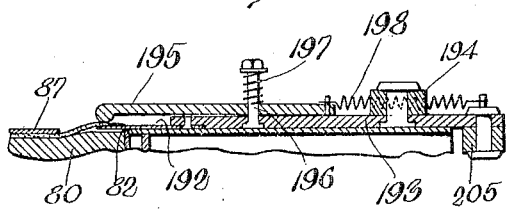
Fig. 3, represents an enlarged sectional view taken on the line 3—3 of Fig. 1.

Fig. 6, represents an enlarged sectional view taken on the line 6—6 of Fig. 1.

Figs. 7 and 8, respectively represent sectional views taken on the lines 7—7 and 8—8 of Fig. 6.

Fig. 9, represents an enlarged sectional view taken on the line 9—9 of Fig. 1 to show approximately the manner in which a counter blank is held by the die and its clapper during the skiving operation.

Fig. 10, represents a similar view of a portion of Fig. 9, but showing the clapper in its raised position, as when the blank is fed to the die, and the means for holding the blank against the gage member of the die.

Fig. 11, represents an enlarged plan view in elevation of one of the skiving knives and its holder with the waste or scrap discharge roller removed therefrom.

Fig. 12, represents an end view in elevation of same with the scrap discharge roller in place.

Fig. 13, represents a sectional view taken on the line 13—13 of Fig. 11 with the scrap discharge roller in place.

Figs. 14 and 15, respectively represent sectional detail views taken on the lines 14—14 and 15—15 of Fig. 5.

Fig. 16, represents a similar view taken on the line 16—16 of Fig. 4.

Fig. 17, represents a plan view in elevation of a strip of leather board or leather from which the counter blanks are cut; dotted lines thereon indicating the relative angles of the cutting lines thereof.

Fig. 18, represents a similar but approximately full size view of a blank cut from the strip, dotted lines indicating the outline shape of the finished counter in the flat.

Fig. 19, represents a similar view of a blank after the completion of the cutting and skiving operation.

Fig. 20, represents a sectional view taken on the line 20—20 of Fig. 18.

Fig. 21, represents a similar view taken on the line 21—21 of Fig. 19.

Like characters of reference designate corresponding parts throughout.

The machine illustrated in the drawings and hereinafter described is intended and adapted to receive a strip or strips of leather board or other counter stock of material, of a desired width and of any length adapted to be supplied to the machine which strip or material S is operated upon by elements of the machine; first to divide or sever said strips to provide a progressing series of counter blanks; second to take such blanks in succession from the line of their initial direction to devices for conforming, adjusting and holding said blanks during the skiving operation and for facilitating such operation, and finally for delivering the counters from the machine and for discharging the scrap material removed from the blank in the skiving operation.

Without thereby limiting this invention I prefer to use strips of stock similar to that shown in Fig. 17 having one or both of its edges beveled as shown in said Fig. 17 and also, on larger scale in Fig. 20, but it is evident that said edge or edges need not necessarily be beveled and in some cases I may prefer to use strips of stock having rectangular edges or edges of any desired and suitable shape.

The term "counter" used herein is intended to refer to the product of this improved machine as such product is adapted to be used as a counter for a boot or shoe by the simple bending or other manipulation of said product to incorporate the same in a boot or shoe structure. It is evident however that the counter constituting the product of this machine may be operated upon in any desired manner as by molding, crimping or otherwise.

In carrying the present invention into practice in a somewhat specific embodiment of the same I have provided a machine having a suitable frame constituted in part by the base 25 from which project upwardly the front and rear standards or sides 27 and 28, respectively, on which is mounted the bed 29. The end portions of the drive shaft 30 are journaled in suitable bearings in said base 25 and said shaft is driven through the belt and pulley 30ª. The oppositely disposed beveled pinions 31 and 32 are carried by said shaft and respectively mesh with the beveled gears 33 and 34 fast on the lower ends of the upright shafts 35 and 36. The latter shafts are journaled in suitable bearings in said base 25 and bed 29 and respectively carry the spur gears 37 and 38. Said spur gears respectively mesh with corresponding gears 40 and 41 carried by the upright shafts 42 and 43 which also are journaled in suitable bearings in said base 25 and bed 29. The upper ends of the left hand upright shafts 35 and 42 respectively carry the coöperating skiving knives 44 and 45. The latter are provided with the knife blade holders 46 and 47 comprising the split collars 48 and 49 secured to said shafts by bolts 50, and the oppositely disposed arms or wings 51 and 52 projecting from the said collars and having the radial forward sides 53, 53. The under side of said arms 51 and 52 are provided with the sockets 54, 54 in which are secured the knife blades 55, 55 by the bolts 56 extending through slots in said arms and threaded into said blades. The adjusting screws 57 engage the rear ends of said blades. The cutting edges 59 of said blades are preferably parallel to and slightly in advance of said radial forward edges 53 and substantially contact with the cutting table 60 mounted on said bed 29. The under sides of said knife blades are substantially flat and at an acute angle with said cutting table; said cutting edges being formed by grinding the beveled surfaces 61 on said knife blades. Said knife blade holders are further provided with the scrap discharge rollers 64 each consisting of a series of disks 65 secured on a shaft 66 and spaced from each other by collars 67. Said disks 65 are made of rubber or similar material and have their cylindrical surfaces corrugated. Said shafts 66 are mounted to rotate in bearings on the ends of the forwardly projecting arms 69 of brackets 70 respectively secured to said arms 51 and 52, thereby bringing said scrap discharge rollers 64 slightly above and in advance of the respective cutting edges of said knife blades. The pinions 73 are secured on the outer ends of said shafts 66.

The skiving knives 74 and 75 are respectively mounted on the right hand upright shafts 36 and 43 and correspond in construction and arrangement with skiving knives 45 and 44.

The oppositely disposed left and right hand dies 77 and 78 are mounted upon said bed 29 and each consists of a base 79 upon which a die block 80 is detachably secured by adjusting screws 81. The cutting edges 82 of said die blocks are adapted to be engaged by the cutting edges of their adjacent pair of skiving knives and approximately correspond to the outline shape of the completed counters. Said die blocks are provided with the beveled surfaces 83 which substantially correspond in outline shape to the skived portions of the counters. The top surfaces of the die blocks are further hollowed out from the inner margin of said beveled surfaces 83 as shown at 84. The inner ends of the left hand and right hand clappers 86 and 87 respectively extend adjacent the hollowed out portions 84 of said die blocks. Said clappers are respectively pivoted on pins 88, 88 supported by brackets 89 on bed 29 and the under surfaces of their outer ends are engaged by rollers 91, 91 mounted on oppositely disposed elbow levers 92, 92 pivoted at 93, 93 on the frame of the machine. The inward movement of the upper arms of said elbow levers is limited by the engagement of the adjustable stop screws 94, 94 with bed 29. The longitudinally adjustable links 95, 95 connect the lower arms of said elbow levers with cam levers 96, 96 pivoted at 97 upon the frame of the machine. The inner ends of said cam levers are held in engagement with the cams 99 and 100 by springs 101, 101. Cams 99 and 100 are respectively mounted on the upright shafts 35 and 36.

The upright bracket 103 is adjustably secured to the bed of the machine by bolts 104 and is provided with bearings 105, 105 in which are pivoted the studs 106, 106 projecting from the top and bottom of the cutting off knife holder 107. The latter is provided with the transverse aperture 109 into which extends the cutting edge of the stationary knife 110 secured to the forward side of the web 111 of said holder 107. The knife 113 is mounted to slide vertically in ways on the rear side of web 114 of holder 107 to coöperate with stationary knife 110. The roller 116 is centrally mounted on the rear side of said knife 113 and engages a transverse horizontal slot in the forward end of the work support 117 mounted to slide vertically in the elongated recess or channel 118 in said bed 29. Said work support 117 is secured, for longitudinal adjustment, to the bar 119 by screws 120 extending through slots in said work support and threaded into said bar. The upper ends of the vertical studs 121, 121 are secured to said bar 119 and project downwardly through bearings 122, 122 on bed 29, and their lower ends are secured to the horizontal beam 123. The latter is furnished with rollers 125, 125 near its ends which rest on the inner ends of arms 126, 126 of cam lever 127 pivoted on the stationary shaft 128 which is supported at its ends by the front and rear sides of the frame. The other arm 129 of said cam lever is provided with a cam roll 130 which engages cylinder cam 131 carried by upright shaft 35.

The end gage 135 is mounted to slide longitudinally of work support 117 and is held in sliding engagement therewith by guides 136, 136 secured to said work support and receiving the rearwardly extending plate 137 of said gage 135. The latter is also provided with the side guide bars 138, 138 having outwardly flaring ends, and the top guide spring 139 having its front end bent upwardly. The rod 140 pivotally connects with said end gage 135 and is adjustably connected with the arm 141 which is secured to the uper end of the vertical pin 142 mounted in the bracket 143 secured to bed 29. Gage 135, by its location, determines the length of counter stock received by the machine prior to the operation of the stock severing device, to be hereafter described and adjustment of such gage 135 is effected by adjustment of the rod 140 in its connection with arm 141. The arm 145 on the lower end of pin 142 is connected by link 146 to the outer arm of cam lever 147 pivoted at 148 on a bracket projecting from the rear side of the frame. The inner arm of said cam lever is provided with a cam roll 149 which engages the grooved cam 150 carried by upright shaft 42.

The left hand and right hand lateral blank feeding devices 155 and 156, are oppositely disposed above cutting table 60 and each is provided with a pair of vertical spring fingers 157, 157 having their upper ends secured to the inner ends of bars 158, 158. Pairs of vertical pins 159, 159 are also secured to the respective bars 158 and have their lower projecting ends pointed. Said bars 158, 158 are provided with the upwardly projecting studs 160, 160 which are adjustably secured in sockets in blocks 161, 161 by set screws 162. Said blocks 161 are adjustably mounted on the cross bars 163, 163, and are secured by set screws 164.

Said cross bars 163, 163 connect the inner ends of each pair of parallel slide rods 165, 165 which are mounted to slide in blocks 166, 166 mounted on rock shafts 167, 167 supported in bearings on brackets 168, 168 projecting upwardly from the left hand and right hand ends of bed 29. The arms 170, 170 are secured on the ends of said rock shafts and are connected to the respective cam levers 171 and 172 by the links 173. (Figs. 1 and 5.) Cam lever 171 is pivoted on shaft 128 and its outer arm is furnished with cam roll 174 which engages the groove in cylinder cam 175 carried by the upright shaft 42. Cam lever 172 is pivoted on shaft 177, corresponding to said shaft 128, and its outer end is provided with cam roll 178 which engages the groove in cylinder cam 179 carried by upright shaft 43.

Upwardly projecting lugs 180, 180 are respectively on the rear rods of said pairs of slide rods 165, 165 and are connected to the levers 181, 181 by links 182, 182. Said levers 181 are respectively pivoted at their lower ends on brackets 183, 183 respectively projecting from the left and right hand sides of the frame of the machine. Links 185, 185 respectively connect said levers 181 with the upper arm of elbow cam levers 186, 186 which are pivoted on the frame. The lower arms of said cam levers are provided with cam rolls which engage the grooves in cylinder cams 187, 187 mounted on said respective upright shafts 35 and 36.

The left hand and right hand work releasing devices 190, 191 respectively, are mounted to travel over the top of cutting table 60, and are provided with the lower work engaging fingers 192, 192 of spring sheet metal secured to the respective ends of the forward arms of the levers 193, 193 pivoted on the ends of arms 194, 194. The upper work engaging fingers 195, 195 are pivoted on pins 196, 196 on said levers 193, 193 and are pressed downwardly by springs 197, 197 on said pins 196, 196. The forward ends of said upper fingers 195, 195 are rounded over and tend to be swung into engagement with said lower fingers by coil springs 198, 198 connected to the rear ends of levers 193, 193. Said upper fingers 195, 195 are provided with lugs 199, 199 adapted to be engaged by lugs 200, 200 adjustably secured to said arms 194, which latter arms are respectively fastened on the upper ends of vertical shafts 201, 201 having their upper portions pivoted in brackets 202, 202 on the rear of bed 29, and the lower portions of said vertical shafts are pivoted in brackets 203, 203 on the rear side of the frame of the machine. Links 205, 205 are pivoted at their outer ends on said brackets 202, 202 and their inner ends are connected to the rear ends of levers 193. The arms 207, 207 are respectively secured to the lower ends of said shafts 201 and are connected to cam levers 209, 209 pivoted on brackets 210, 210 by links 208, 208. Said cam levers are furnished with cam rolls 211 which respectively engage the grooved cams 212 and 213 carried by upright shafts 42 and 43, respectively. (Figs. 1, 5 and 14.)

Referring again to the cutting off knife holder 107, the same is provided on its front side with the laterally adjustable strip guides 215 consisting of the plates 216 secured to holder 107 by screws 217 extending through horizontal slots in said plates. The upper ends of said plates are bent inwardly toward said horizontal aperture 109. The lower end of said knife holder 107 is provided with the arm 219 connected to elbow cam lever 220 by link 221 adapted to be adjusted lengthwise of said arm. Cam lever 220 is pivoted on bracket 223 secured to the underside of bed 29 and is furnished with a cam roll which engages grooved cam 225. (Figs. 1, 4 and 16.)

In the operation of the machine, the usual strip of leather or leather board S preferably having bevel edges is fed between the cutting off knives 110 and 113 and over work support 117 to the gage 135; the strip being guided and held by the strip guides 215 and by side guide bars 138, and top guide spring 139 of said gage 135. (Figs. 1, 4, 5 and 6.) Work support 117 is then raised to the level of cutting table 60 by cam 131 through cam lever 127, beam 123, studs 121 and bar 119. The movement of said work support transmits a like movement to knife blade 113, through roller 116, causing said knife blade to coöperate with knife blade 110 to cut off the blank B from the strip S. In order to save stock and to make the blanks B more nearly conform to the shape of the finished blank, I prefer to alternately cut off the blanks from strip S on oppositely inclined or diagonal lines as indicated by dotted lines in Fig. 17. This is effected by the proper oscillation of cut off knife holder 107 operated by cam 225 through elbow cam lever 220, link 221, and arm 219. (Fig. 16.) The amount of inclination of the respective cutting operations may be varied as desired by the adjustment of link 221 lengthwise of arm 219.

Immediately following the cutting of a blank the forward end of the lateral feeding device 155 is swung downwardly from the forward raised position shown in the drawing to cause the fingers 157, 157 to position themselves adjacent the right hand edge of the blank and to cause the pointed ends of pins 159 to be forced into the top surface of the blank. Said downward engaging movement of the forward end of said feeding device is effected by cam 175 through cam lever 171, link 173, arm 170 and shaft 167. (Figs.

1, 4, 5, 6 and 7.) Upon the completion of the latter operation, end gage 135 is drawn back out of engagement with said blank by cam 150 through cam lever 147, link 146, shaft 142, arm 141 and link 140. (Figs. 1 and 15.) Said feeding device 155 then carries the blank to the left hand die 77, with the base edge of blank B against stops 77ᵃ in which position blank B is held by the fingers 157 of the particular blank feeding or transporting device 155. The blank is positioned on said die 77, beneath the inner end of the previously raised clapper 86, which, in its closing movement, forces the blank B down onto the die 77 and causes the upward deflection of the edge portion of blank B extending beyond clapper 86. In Fig. 10 is shown the relative position of a blank on the right hand die 78, before clapper 87 is closed, which corresponds to said positioning on die 77. Said die 78 is shown as being provided with a pair of stops 78ᵃ which correspond to said stops 77ᵃ. It is understood that such lateral movement of feeding device 155 to the left is effected by cam 187, through elbow cam lever 186, link 185, lever 181, and link 182.

Following said positioning of the blank on die 77, cam 99, through cam lever 96, link 95, and elbow lever 92 forces clapper 86 to clamp the blank down onto the die; and immediately the feeding device 155 is disengaged from the blank by cam 175 through said connecting mechanism, and is returned toward its initial position by cam 187 through said connecting mechanism. When the blank is thus held down onto the die 77 by said clapper 86 the skiving devices carried by shafts 35 and 42 are brought into operation. Assuming that the skiving device of shaft 35 is swinging in the direction of the arrow on collar 48, Fig. 1, the knife of such skiving device will make the first cut, the blade, similar to blade 55, Figs. 9, 12 and 13 traveling very close to the upper surface of clapper 86 and engaging that edge portion of blank B which extends above said clapper at about the point $b$ Fig. 18, taking a cut approximately from the dotted line $c$ to the dotted line $d$ and extending diagonally from dotted line $c$ through the thickness of the blank B to said line $d$ whereby the margin of blank B beyond line $d$ is cut away. After the skiving blade engages the material of blank B at $b$ the course of said knife is for a time substantially longitudinal of said blank B in the direction indicated by the arrow from the line of $b$, but this direction of the skiving knife is gradually changed to a curving direction the curve of which is accentuated as the skiving knife approaches the end of the blank B and finally the skiving knife swings approximately at right angles to its first direction and cuts through the material to the base edge $g$ of said blank B. After the skiving knife of the skiving device operated by shaft 35 has moved past line $b'$ sufficiently to clear a path for the skiving device of shaft 42 the knife of this latter device engages the material of blank B at or about line $b'$ and takes a cut, similar to that just above described in the general direction indicated by the arrow from said line $b'$ following substantially the dotted line $d$. The initial cut of this second knife removes any irregularities on the blank left by the first skiving operation between the lines $b$ and $b'$ and it is to be noted that the blank B may, to some extent, be operated upon simultaneously by both skiving knives, provided that the carriers for said knives do not interfere. It will be observed that the skiving knife blades are so ground and positioned that they tend to force the blank down onto the edge of the die and that the skiving action of the knives respectively extend from approximately the center to the ends of the blank, resulting in the blank being uniformly and smoothly skived. (Figs. 19 and 21.)

The trimmings or scraps $f$ which are skived or cut from the blank by the skiving knives, are forced between the respective discharge rollers 64 and the beveled surfaces 61 of the knife blades and are carried thereby until they are respectively discharged into the chutes 64ᵃ, 64ᵃ at the respective left hand corners of the cutting table 60. The discharge of the scraps into said chutes is effected by the downwardly projecting spring arms 73ᵃ, 73ᵃ which impart a quick spin to discharge rollers 64 through the engagement of the respective pinions 73, 73 with said spring arms, whereby said scrap is given a forward impulse.

At the completion of the skiving of the blank on the left hand die, the fingers 192 and 195 of releasing device 190 engage the rear end of the blank, and immediately thereafter cam 99 permits spring 101 to raise clapper 86, allowing said releasing device to release the blank from the die and discharge it into chute 190ᵃ at the rear of the machine. Said fingers of the releasing device are moved inwardly to engage the blank by cam 212 through cam lever 209, link 208, arm 207, shaft 201, arm 194 and lever 193 which carry said fingers. As said fingers are being moved inwardly the forward end of lever 193 is swung away from arm 194 by link 205 which disengages lug 199 on finger 195 from lug 200 on said arm, thereby permitting spring 198 to swing finger 195 into position over finger 192 to cooperate with the latter to engage the end of the blank. As said fingers approach the limit of their rearward movement, lug 199 again engages lug 200, which disengages finger 195 from the blank, thereby effecting the discharge of the blank into said chute 190ᵃ.

Immediately after the first blank is fed from the work support 117 toward the left hand die 77, as hereinbefore described, cam 131 effects the lowering of said work support and cutting off knife 113 through the connecting mechanism, and end gage 135 is then moved forward to its effective position. The movement of said end gage is accomplished by cam 150, cam lever 147, link 146, arm 145, shaft 142, arm 141 and link 140. (Figs. 1, 5, 6 and 15.) After said positioning of said end gage, the remainder of the strip S is fed into engagement with the end gage and the next blank is cut from the strip and is fed to the right hand die by feeding device 156 which operates in a similar manner as feeding device 155. The blank fed to the right hand die is operated upon and finally released into right hand chute 191ᵃ in the same manner as the blank fed to the left hand die which was finally released into chute 190ᵃ.

It is to be noted that two blanks may be subjected to skiving operation at or about the same time and that before one of said blanks is delivered from the machine a third blank may have been severed from the strip S and may be ready for an approaching blank engaging and transferring device 155 or 156 as the case may be.

It will be seen that dies of various sizes may be used on the machine and the operative parts of the machine correspondingly adjusted to effect the cutting off and skiving of a variety of sizes of counter blanks.

Having thus described my invention I claim as new and desire to secure by Letters Patent:

1. A counter skiving machine comprising means to receive counter stock fed forward, a gage to limit such feeding movement and having a member to engage said stock during cutting, means to cut said stock into counter blanks, and means to operate said gage to move said member to inoperative position.

2. A counter skiving machine comprising means to receive counter stock fed forward, a gage for limiting such feeding movement, an oscillating cutter member having a blade extending transversely of said stock, and intermittently acting means to oscillate said member.

3. A counter skiving machine comprising a guide to receive an indeterminate length of counter stock, a gage intermittently brought to position to determine the size of a blank to be cut from said stock, and an intermittently acting stock severing means.

4. A counter skiving machine comprising a counter stock cutter and a gage spaced apart, means to positively guide counter stock in its movement past said cutter toward said gage, means to operate said cutter, and means to move the blank severed by said cutter to a point of release from said guide.

5. A counter skiving machine comprising a counter stock cutter and a gage spaced apart, means to positively guide counter stock in its movement past said cutter toward said gage, means to operate said cutter, and means to lift the blank severed by said cutter out of said guiding means.

6. A counter skiving machine comprising a bed having a channel, a counter stock receiving and lifting means having a member located in said channel, a counter stock cutter to operate in said channel, and a counter stock gage spaced from said cutter.

7. A counter skiving machine comprising a bed having a channel, a counter stock receiving and lifting means having a member located in said channel, a counter stock cutter to operate in said channel, and a retractive counter stock gage spaced from said cutter and coöperating with said blank receiving means.

8. A counter skiving machine comprising a bed having a channel, a counter stock receiving and lifting means having a member located in said channel, a counter stock cutter to operate in said channel, and a counter stock gage spaced from said cutter and adjustable relative to said cutter.

9. A counter skiving machine comprising a bed having a channel, a counter stock receiving and lifting means having a member located in said channel, a counter stock cutter to operate in said channel, a counter stock gage movably mounted relative to such receiving means, and mechanism for operating said cutter and for retracting said gage.

10. A counter skiving machine comprising a bed having a channel, a counter stock receiving and lifting means having a member located in said channel, a counter stock cutter to operate in said channel, a counter stock gage movably mounted relative to such receiving means, and mechanism for operating said cutter and for raising said receiving means, said mechanism having means to retract said gage from its normal position.

11. A counter skiving machine comprising a bed having a channel, a counter stock receiving and lifting means having a member located in said channel, a counter stock cutter to operate in said channel, a counter stock gage adjustable lengthwise of said stock receiving means, and mechanism for retractively moving said gage and for thereafter raising said stock receiving means.

12. A counter skiving machine comprising a bed having a channel, a counter stock receiving and lifting means having a member located in said channel, a counter stock cutter to operate in said channel, at a point spaced from said stock receiving means, and means to gage the stock received by said means.

13. A counter skiving machine comprising a bed having a channel, a counter stock receiving and lifting means having a member located in said channel, a counter stock cutter to operate in said channel in conjunction with said stock receiving means, and means to operate said receiving means and said cutter simultaneously.

14. A counter skiving machine comprising a bed having a channel, a counter stock receiving and lifting means having a member located in said channel, a counter stock cutter to operate in said channel and mounted to oscillate, and mechanism to effect oscillation of said cutter at each operation of said receiving means.

15. A counter skiving machine comprising a bed having a channel, a counter stock receiving member movable vertically in said channel, a cutter member adapted to oscillate and having a blade adapted to operate in said channel, connections between said receiving member and said cutter member, and means to raise said receiving member.

16. A counter skiving machine comprising a bed having a channel, a counter stock receiving member movable vertically in said channel, a cutter member adapted to oscillate and having a blade adapted to operate in said channel, connections between said receiving member and said cutter member, means to raise said receiving member and retract the same, and means to effect an oscillatory motion of said cutter member at each retraction of said receiving member.

17. A counter skiving machine comprising a bed having a stock receiving channel, a counter stock receiving member movable vertically in said channel, means to intercept said stock to limit the length of a counter blank, a cutter member connected with said receiving member and having a blade adapted to cut said stock during movement of said receiving member, and means to move said receiving member vertically.

18. A counter skiving machine comprising a bed having a stock receiving channel, a counter stock receiving member movable vertically in said channel, means to operate said member, a gage slidably mounted and adapted to extend above said member in one position, a stock cutter member having a blade extending into said channel, said cutter member mounted to oscillate on a vertical axis, connections between said cutter member and said receiving member to effect simultaneous operation thereof, and means to retract said gage.

19. A counter skiving machine comprising counter strip guiding means, counter blank gaging means, cutting means for severing counter blanks from a strip fed forward, a counter skiver mechanism having a counter blank holder located out of the strip feeding path, and means to positively engage a counter blank and to transfer said blank to said holder.

20. A counter skiving machine comprising counter strip, guiding means, counter blank cutting means, a counter blank clamp, a skiving means, and means to transfer a blank from the cutting position to said clamp and for holding said blank against retraction until grasped by said clamp.

21. A counter skiving machine comprising counter strip, guiding means, counter blank cutting means having a predetermined speed of operation, and plural skiving means to receive such blanks, each said skiving means adapted to effect a complete operation only during plural operations of said cutting means.

22. A counter skiving machine comprising counter strip guiding means, counter blank cutting means, plural skiving means located out of the line of feed, and plural transfer means to engage blanks in such line of feed and to transfer said blanks to said skiving means.

23. A counter skiving machine comprising a bed having a channel to receive a counter strip, strip cutting means, a counter skiving means located on said bed at one side of said channel, and means to transfer a blank cut from said strip to said skiving means.

24. A counter skiving machine comprising a bed having a channel to receive a counter strip, strip cutting means, a counter skiving means located on said bed at one side of said channel, means to raise a blank in said channel, and means to transfer a blank cut from said strip to said skiving means.

25. A counter skiving machine comprising a bed having a channel to receive a counter strip, a gage to limit the feeding of said strip into said channel, strip cutting means, a counter skiving means located on said bed at one side of said channel, and means to transfer a blank cut from said strip to said skiving means.

26. A counter skiving machine comprising a bed having a channel to receive a counter strip, strip cutting means, a pair of clamp members fixed on said bed laterally of said channel, coöperating clamp members movably mounted, skiving means operating relative to said clamps, and a pair of counter blank engaging devices operating alternatively to take blanks from the line of said channel and to deliver said blanks to said clamps.

27. A counter skiving machine comprising a bed having a channel to receive a counter strip, strip cutting means, a pair of clamp members fixed on said bed laterally of said channel, coöperating clamp members movably mounted, skiving means operating relative to said clamps, and a pair of counter blank engaging devices operating alternatively to take blanks from the line of said channel and to deliver said blanks to said clamps and having means to hold said blanks between said clamp members until the latter are approximately closed.

28. A counter skiving machine comprising means to guide forward counter stock, means to sever counter blanks from said stock, a clamp located laterally approximately in the horizontal plane of the blank severing position and adapted to open toward said position, and means to transfer blanks from said position to such clamp.

29. A counter skiving machine comprising means to guide forward counter stock, means to sever counter blanks from said stock, a clamp located laterally approximately in the horizontal plane of the blank severing position and having a relatively fixed member and a hingedly movable member adapted to open toward said position, and means to transfer blanks from said position to said clamp.

30. A counter skiving machine comprising means to guide forward counter stock to a severing position, means acting intermittently on said stock to sever counter blanks therefrom, a pair of clamps located laterally horizontally of said severing position and having movable clamping members, skiving devices coöperating with said clamps, transfer means to transfer blanks from the severing position to said clamps, and mechanism for operating said transfer means, clamps and skiving devices relatively to said severing means.

31. In a counter skiving machine a counter blank holder clamp having means to deflect an edge portion of a blank, held thereby, to clear said clamp, and a skiving means having a circular path of movement to operate on said edge of the blank.

32. In a counter skiving machine a counter blank holder clamp having a member having a depression, means to press a portion of a counter blank into said depression to deflect a free edge of said blank, and a skiving device having a circular path of movement for operating on said free edge.

33. A counter skiving machine comprising a bed having a channel, a clamp member located at one side of said channel and having a depression, said bed constituting a flat way between said channel and said clamp member, a second operating clamp member, and a transfer means adapted to travel over said bed and channel between said channel and said first mentioned clamp member and having means to receive and hold a counter blank pressed thereagainst.

34. A counter skiving machine comprising a bed having a channel, a clamp member located at one side of said channel and having a depression, said bed constituting a flat way between said channel and said clamp member, a second operating clamp member, and a transfer means adapted to travel over said bed and channel between said channel and said first mentioned clamp member and having spurs to receive a blank and a guard finger to engage one edge of said blank.

35. In a counter skiving machine, the combination with a counter blank holder having means to hold a blank with a free unsupported edge extending beyond said holder, of a skiving means mounted to rotate about an axis transverse to the general extension of the counter under operation and operating as to its cutting edge in a path to which said free edge is transversely inclined.

36. In a counter skiving machine, the combination with a skiving means having a definite circular path of cutting, of a counter blank holder having means to receive a counter blank approximately in said path of cutting and to deflect an edge portion of said blank to a transverse inclination with said path.

37. In a counter skiving machine the combination with a counter blank holder adapted to sustain a counter blank with an edge deflected and exposed, of a skiving device mounted to rotate about an axis transverse to the general extension of the counter under operation.

38. In a counter skiving machine the combination with a counter blank holder adapted to sustain a counter blank with an edge deflected and exposed, of a skiving device comprising a cutting blade carried by a rotary shaft extending transversely to the general extension of the counter under operation.

39. In a counter skiving machine the combination with a counter blank holder adapted to sustain a counter blank with an edge deflected and exposed, of a pair of skiving devices adapted to operate on said edge.

40. In a counter skiving machine the combination with a counter blank holder adapted to sustain a counter blank with an edge deflected and exposed, of a pair of skiving devices adapted to operate on said edge in different directions.

41. In a counter skiving machine the combination with a counter blank holder adapted to sustain a counter blank with an edge exposed, of a pair of skiving devices arranged to operate on said edge and operating alternately in overlapping paths in opposite directions.

42. In a counter skiving machine the combination with a counter blank holder adapted to sustain a counter blank with an edge exposed, of a pair of skiving devices arranged to operate on said edge and having paths overlapping for a portion of their length, and means to operate said skiving devices in succession over said overlapping paths whereby a portion of material left after the initial cut of one skiving device is removed by the other skiving device.

43. In a counter skiving machine the combination with a counter blank holder adapted to sustain a counter blank with an edge exposed, of a pair of skiving devices having courses of movement in generally opposite directions and adapted to engage said edge at or near its center.

44. In a counter skiving machine the combination with a counter blank holder adapted to sustain a counter blank with an edge exposed, of a pair of rotary shafts located approximately at the sides of said holder and having skiving cutters.

45. In a counter skiving machine the combination with a counter blank holder adapted to sustain a counter blank with an edge exposed, of a pair of rotary shafts located approximately at the sides of said holder and having skiving cutters and means to supply counter blanks to said holder in a path between said skiving cutters.

46. In a counter skiving machine the combination with a counter blank holder adapted to sustain a counter blank with an edge exposed, of a pair of rotary shafts located approximately at the sides of said holder and having skiving cutters, a counter blank transfer means to supply counter blanks to said holder in a path between said skiving cutters, and means to retract said transfer means out of the paths of said cutters.

47. In a counter skiving machine the combination with a counter blank holder adapted to sustain a counter blank with an edge exposed, of a pair of skiving devices to operate on said edge, and means to engage and carry waste cut from said edge.

48. In a counter skiving machine the combination with a counter blank holder adapted to sustain a counter blank with an edge exposed, of a pair of skiving devices to operate in opposite directions on said edge and a pair of waste engaging devices.

49. In a counter skiving machine the combination with a counter blank holder adapted to sustain a counter blank with an edge exposed, of a pair of skiving devices to operate in opposite directions on said edge and a pair of waste engaging devices traveling with said skiving devices.

50. In a counter skiving machine the combination with a counter blank holder adapted to sustain a counter blank with an edge exposed, of a pair of skiving devices to operate in opposite directions on said edge and a pair of waste engaging devices mounted on members of said skiving devices and coöperating with said skiving devices to carry forward waste cut from said edge.

51. In a counter skiving machine the combination with a counter blank holder adapted to sustain a counter blank with an edge exposed, of a pair of skiving devices to operate on said edge, and means movable in unison with said skiving devices to take waste from said devices and to retain said waste during the skiving operation.

52. In a counter skiving machine the combination with a counter blank holder adapted to sustain a counter blank with an edge exposed, of a pair of skiving cutters operating on said edge, each of said cutters provided with a waste engaging roll.

53. In a counter skiving machine the combination with a counter blank holder adapted to sustain a counter blank with an edge exposed, of a pair of rotatable shafts, skiver carrying members mounted on said shafts, skiver blades adjustably mounted on said members, and waste engaging devices carried by said members and coöperating with said blades.

54. In a counter skiving machine the combination with a counter blank holder adapted to sustain a counter blank with an edge exposed, of a pair of rotatable shafts, skiver carrying members mounted on said shafts, skiver blades carried by said members, and waste engaging rolls carried by said members and bearing on the edge of said blank in advance of said skiver blades.

55. In a counter skiving machine the combination with a counter blank holder adapted to sustain a counter blank with an edge exposed, of a pair of skiving devices to operate on said edge, a pair of waste engaging means operatively mounted, and means to operate said engaging means at times to release waste therefrom.

56. In a counter skiving machine the combination with a counter blank holder adapted to sustain a counter blank with an edge exposed, of a pair of skiving devices to operate on said edge, each of said skiving devices having an operative waste engaging member, and means to actuate said member at the end of a skiving operation.

57. In a counter skiving machine the combination with a counter blank holder adapted to sustain a counter blank with an edge exposed, of a pair of skiving devices to operate on said edge, each of said skiving devices having an operative waste engaging means, furnished with an actuatable member through which motion may be transmitted to said engaging means, and means to actuate said member at the end of a skiving operation.

58. In a counter skiving machine the combination with a counter blank holder adapted to sustain a counter blank with an edge exposed, of a pair of skiving devices to operate on said edge, each of said skiving devices having a rotatable waste engaging roll furnished with a pinion, and means to engage said pinion to effect sudden rotation of said roll at the completion of a skiving operation.

59. In a counter skiving machine the combination with a counter blank holder adapted to sustain a counter blank with an edge exposed, of a pair of rotatable shafts located approximately at the sides of said holder and having skiver carrying members, skiver blades carried by said members, waste engaging rolls rotatably carried by extensions of said members and having means adapted to be acted on to effect rotation of said rolls, and devices normally located to act on said means at a point in the rotation of said skiver carrying members.

60. A skiving machine comprising counter stock guiding means, counter blank severing means, a pair of counter blank holders, positioned laterally of the severing position, a pair of skiving devices related to each said holder, plural means to transfer blanks from the blank severing position alternately to respective holders, means to progressively accumulate waste during cutting action of said skiving devices, and means to effect operation of said waste accumulating means at times in a waste discharging direction.

61. A skiving machine comprising counter stock guiding means, counter blank severing means, a pair of counter blank holders, positioned laterally of the severing position, a pair of skiving devices related to each said holder, plural means to transfer blanks from the blank severing position alternately to respective holders, means to progressively accumulate waste during cutting action of said skiving devices, means to effect operation of said waste accumulating means at times in a waste discharging direction, and means to discharge skived blanks from said holders.

62. In a skiving machine, the combination with a counter blank holder adapted to sustain a blank with its edge exposed, and means to skive said edge, of means adapted to travel toward and from said holder and having devices to seize said exposed edge of the blank.

63. In a skiving machine, the combination with a counter blank holder adapted to sustain a blank with its edge exposed, and means to skive said edge, of a traveling means having a pair of members between which said exposed edge of said blank may be grasped.

64. In a skiving machine, the combination with a counter blank holder adapted to sustain a blank with its edge exposed, and means to skive said edge, of a pivoted arm, a pair of members operatively carried by said arm, means to swing said arm toward and from said holder, and means to operate said members in the closing direction as they approach said holder to grasp the exposed edge of said blank and in the opening direction to release said members from said edge at a point of discharge.

65. In a skiving machine, the combination with a counter blank holder adapted to sustain a blank with its edge exposed, and means to skive said edge, of a means for removing skived blanks from said holder comprising a traveling means having a member adapted to enter beneath said exposed edge of said blank and a second grasping member to bear on the upper surface of said edge.

REUBEN P. GRANT.

Copies of this patent may be obtained for five cents each, by addressing the "Commissioner of Patents, Washington, D. C."